March 31, 1931.  W. H. HAZARD  1,798,158
STUFFING BOX
Filed Sept. 11, 1925
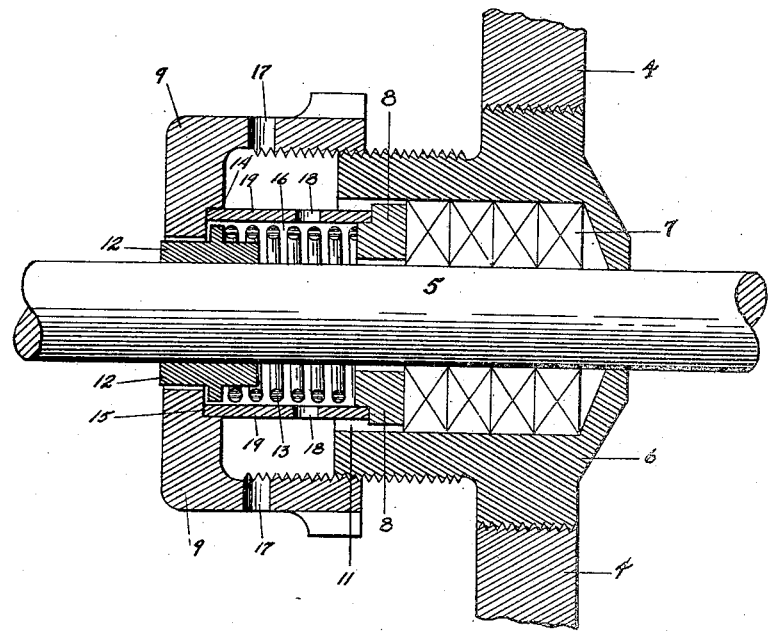
INVENTOR
WILLIAM H. HAZARD
BY Roy M. Eilers
ATTORNEY Patented Mar. 31, 1931

1,798,158

UNITED STATES PATENT OFFICE

WILLIAM H. HAZARD, OF BELOIT, WISCONSIN, ASSIGNOR TO FAIRBANKS, MORSE & CO., OF CHICAGO, ILLINOIS, A CORPORATION OF ILLINOIS

STUFFING BOX

Application filed September 11, 1925. Serial No. 55,784.

My invention relates to improvements in stuffing boxes, and has among its objects the securing of a stuffing box which will prevent the travel of leakage fluid along the rod.

When employing ordinary forms of stuffing boxes on such pieces of apparatus as water pumps, for example, there is always a certain amount of leakage along the piston rod. This leakage is very undesirable, but by my invention of a stuffing box, combined with a creepage intercepter, this leakage may be prevented from traveling along the rod, thereby avoiding the adulteration of lubricating oil and other well known disadvantages.

Although my invention consists largely in the construction and arrangement of parts hereinafter described and particularly pointed out in the claims, yet I do not limit my invention to the precise form or construction of parts shown or the several parts thereof, inasmuch as various alterations may be made without changing the scope of my invention.

Other objects and advantages of my invention will appear from the following drawings and description of the same.

In the drawings, Fig. 1 is a sectional view of a preferred form of my invention as applied to a piston rod stuffing box.

Referring by numerals to the drawings, 5 designates a piston rod, such as that of a water pump, for example. 6 is a stuffing box which may be of any suitable form and which may be screwed into a wall 4 of the pump chamber (not shown). The stuffing box 6 carries packing 7 which may be of any suitable kind and which is held in place by a gland 8. This gland may be of any suitable material and may fit within the stuffing box proper, as shown. In the construction shown, a cylindrical extension 19 is preferably employed interposed between the gland 8 and the gland nut 9. While I show this extension 19 as being a separate part, it may be attached to the gland 8 in any suitable manner or may be integral therewith, or it may be attached to the gland nut 9 in any suitable manner. It is evident that packing 7 may be tightened by screwing down the nut 9, the pressure being transmitted to the gland 8 by means of the extension 19. Between the gland 8 and the inner face of the end of the gland-nut 9 is a chamber 16 and within this chamber is preferably placed a member 12, slidable on rod 5 and which may be provided with a shoulder 14 against which presses one end of a spring 13. The other end of spring 13 preferably presses against the gland 8.

The member 12 is preferably ring shaped and is mounted on the rod 5. The member 12 is preferably free to move relatively to the rod, and the pressure of spring 13 is preferably such that the member 12 may move transversely to accommodate any slight misalignment of the piston rod 5. The spring 13 tends to press member 12 against surface 15 of the gland nut 9. The gland-nut 9 is preferably provided with openings 17 extending therethrough, which openings serve to act as moisture drains for any creepage which may collect within the gland chamber 16. The extension 19 is preferably provided with similar openings 18 for the same purpose.

The member 12 is ring shaped and fits rod 5 as closely as possible and still slide freely; its sole function is to scrape off from the rod, particles of water or other liquid that may pass the packing in stuffing box 7, and which would otherwise creep along rod 5 and enter the chamber containing the working parts and comprising an oil reservoir therefor. Spring 13 serves not only to tend to prevent member 12 from sliding with the rod, but its provision prevents rapid wear of rod 5 and member 12 due to any slight misalignment of the parts. The spring and ring member 12 are in such a position that liquid scraped from the rod will fall in chamber 16, to be discharged through drain openings 17 and 18. It will be seen that spring 13 has no effect whatever on the packing rings 7 in the main stuffing box.

I claim:

1. The combination with a reciprocating pump rod and a stuffing box therefor, of a gland nut, a gland, a hollow spacer member therebetween and definitely positioned with respect to said nut, and forming therewith a chamber in said gland nut, a fluid drain passage from said chamber, a spring-pressed rod-wiping member adapted to operate in said chamber, and a spring tending to hold said wiping member against one wall of said chamber.

2. The combination with a stuffing box, a gland and a one-piece gland nut therefor; of a cylindrical extension forming a chamber between the gland and gland nut, and arranged to serve as a distance piece therebetween, a rod-wiper member adapted to serve as a closure for one end of the chamber in said extension, and a spring within said extension between said member and said gland.

3. In combination with a rod, a stuffing box therefor, a compressible packing in the stuffing box, a gland for compressing the packing and gland nut for said stuffing box, a cylinder extending between said gland and gland nut and forming an annular chamber about the rod and opposite the packing side of said gland, an annular rod-wiper member in said chamber and forming a closure member for one end of the chamber, and a spring in said cylinder between said member and said gland, said spring tending to urge said member against one wall of said chamber, and disposed independently of packing in said stuffing box.

WILLIAM H. HAZARD.